(12) United States Patent
Huang et al.

(10) Patent No.: US 8,487,907 B2
(45) Date of Patent: Jul. 16, 2013

(54) FRONT-END SIGNAL DETECTOR AND METHOD FOR IMPROVING NOISE IMMUNITY OF A CAPACITIVE TOUCH SENSOR

(75) Inventors: Chun-Chung Huang, Hsinchu (TW); Tsun-Min Wang, Miaoli County (TW); Te-Sheng Chiu, Taichung County (TW); Chun-Yu Lin, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 169 days.

(21) Appl. No.: 12/850,836

(22) Filed: Aug. 5, 2010

(65) Prior Publication Data

US 2011/0037723 A1 Feb. 17, 2011

(30) Foreign Application Priority Data

Aug. 14, 2009 (TW) .............................. 98127378 A (51) Int. Cl.
*G06F 3/0412* (2006.01)

(52) U.S. Cl.
USPC .............................. 345/174; 345/156; 345/173

(58) Field of Classification Search
USPC .............................. 345/174; 178/18.01–20.04
See application file for complete search history.

(56) References Cited

U.S. PATENT DOCUMENTS

| | | | |
|---|---|---|---|
| 2008/0162996 A1* | 7/2008 | Krah et al. | 714/27 |
| 2009/0319810 A1* | 12/2009 | Aoyama | 713/300 |
| 2010/0259434 A1* | 10/2010 | Rud et al. | 341/155 |

* cited by examiner

*Primary Examiner* — Amare Mengistu
*Assistant Examiner* — Isaak R Jama
(74) *Attorney, Agent, or Firm* — Muncy, Geissler, Olds & Lowe, PLLC (57) ABSTRACT

A front-end signal detector and a method for improving noise immunity of a capacitive touch sensor start counting a preset time to trigger an interrupt signal responsive to a positive or negative edge of a periodic noise, to break the path through which a demodulated signal comes into a low-pass filter, to prevent noise from accumulating in the low-pass filter, and consequently mitigate the influence of the noise on the detection signal generated by the front-end signal detector.

9 Claims, 10 Drawing Sheets

FRONT-END SIGNAL DETECTOR AND METHOD FOR IMPROVING NOISE IMMUNITY OF A CAPACITIVE TOUCH SENSOR

FIELD OF THE INVENTION

The present invention is related generally to a capacitive touch sensor and, more particularly, to a front-end signal detector for a capacitive touch sensor.

BACKGROUND OF THE INVENTION

Figure 1:
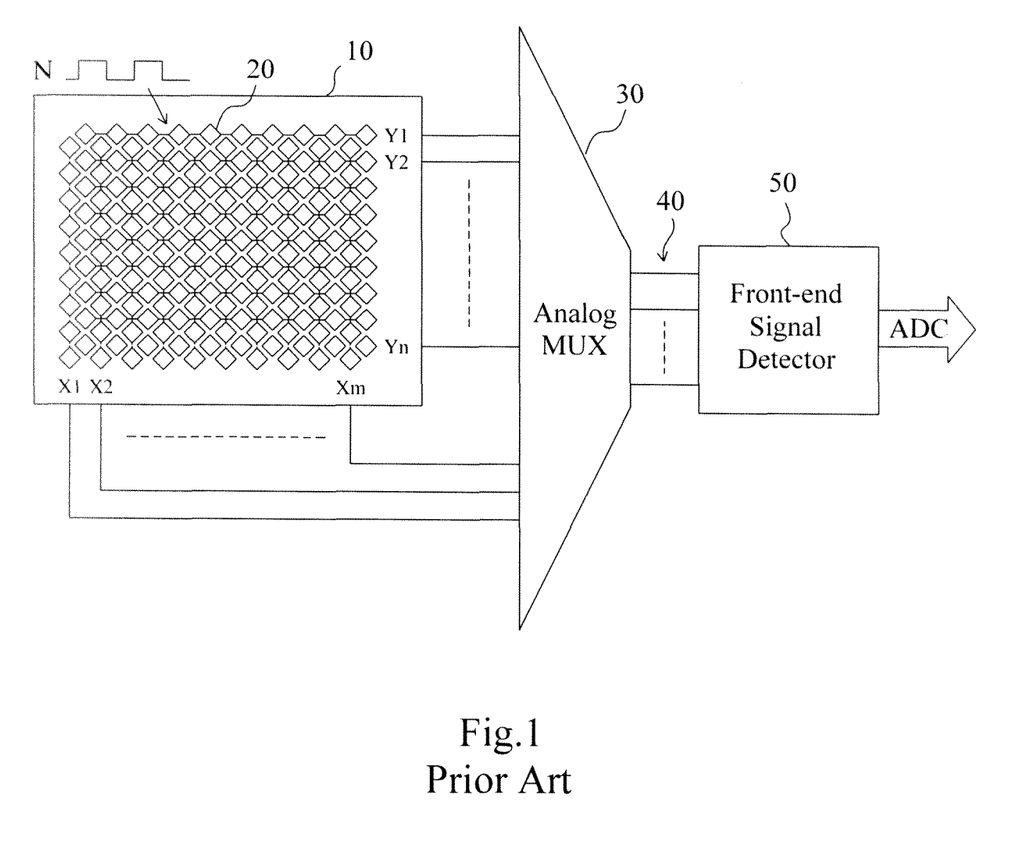
FIG. 1 is a schematic diagram of a capacitive touchpad.

A capacitive touch sensor detects a touch point by detecting the capacitance variations of sensor traces caused by the object touch thereon. However, the capacitance variation is usually slight and thus the ambient noise is easy to interfere with the capacitance touch sensor by introducing thereinto via the coupling capacitor between the noise source and the sensor traces. Furthermore, capacitive touch sensors are mostly applied to electronic apparatus such as mobile devices, so it is also important to cope with interference caused by other components of the electronic apparatus. FIG. 1 is a schematic diagram of a capacitive touchpad that includes a capacitive touch sensor 10 as a human-machine interface, on which there are a plurality of sensor traces 20 connected to an analog multiplexer 30 by which to select among the sensor traces 20 to connect to a front-end signal detector 50, and channels 40 between the analog multiplexer 30 and the front-end signal detector 50, whose number determines the number of sensor traces 20 that can be detected at a same time to extract a sensed value ADC. The sensed value ADC determined by the front-end signal detector 50 is for use in further processing or computation, for example, in determining the coordinates, moving distance, moving speed and so on of a touch point. As can be known from this process, the signal ultimately produced by a capacitive touchpad is based on the sensed value ADC provided by the front-end signal detector 50, so accuracy of the sensed value ADC is very important. When the capacitive touch sensor 10 is installed in an electronic apparatus, components of the electronic apparatus often generates a periodic interference noise N which comes into the sensor traces 20 via the coupling capacitor between the noise source and the sensor traces 20 and thus interferes in the signal extracted by the front-end signal detector 50 from the sensor traces 20 and thereby the sensed value ADC generated by the front-end signal detector 50.

Figure 2:
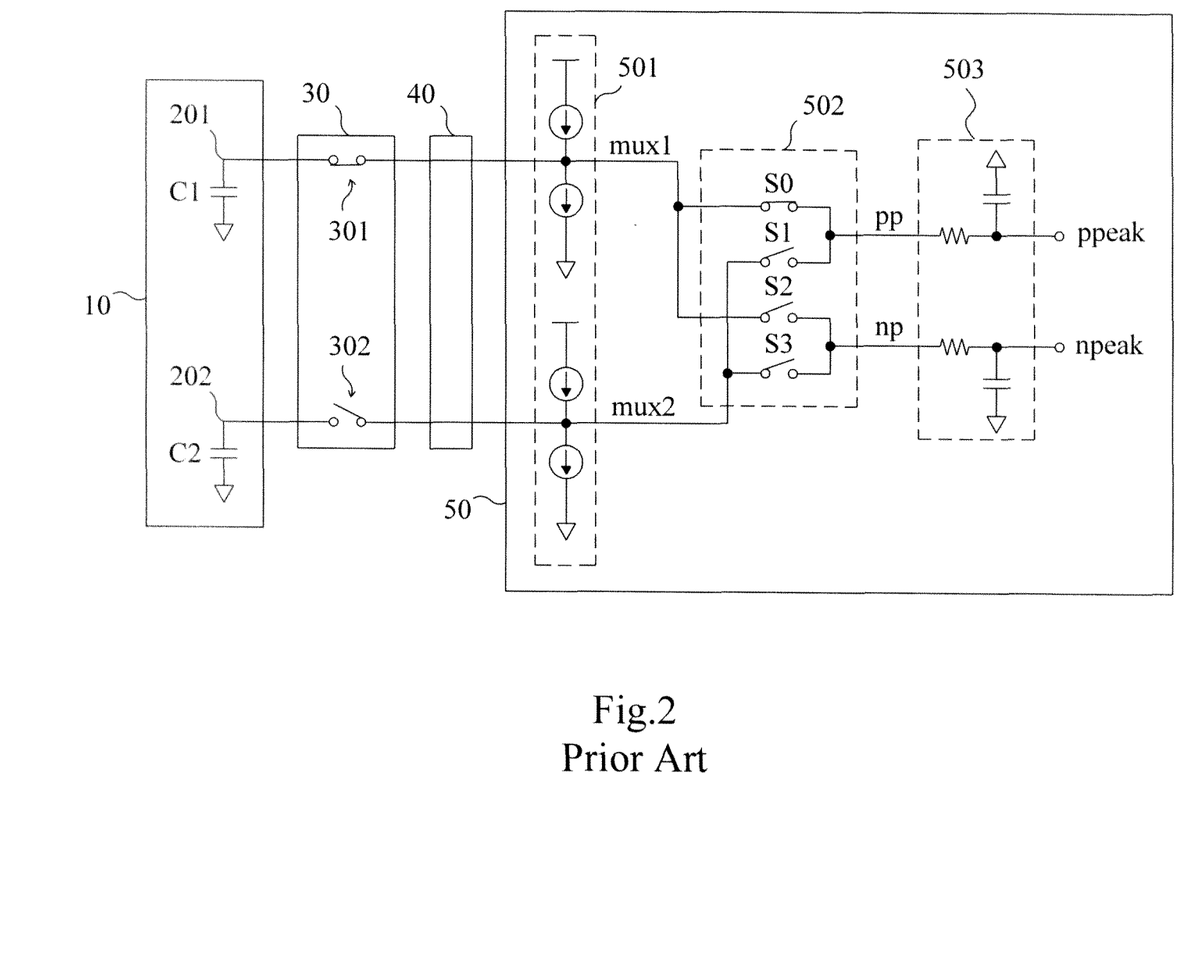
FIG. 2 is a schematic diagram showing a front-end signal detector detecting the capacitance values of sensor traces.
Figure 3:
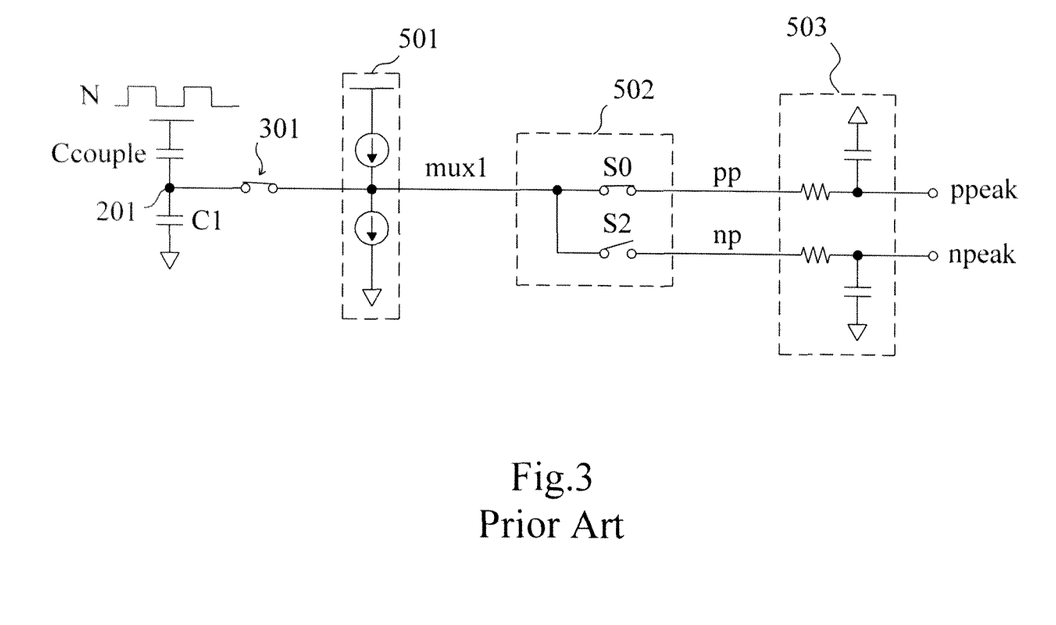
FIG. 3 schematically illustrates the noise coupling to a sensor trace.

For example, referring to FIG. 2, sensor traces 201 and 202 have capacitors C1 and C2 thereon, respectively, and switches 301 and 302 in the analog multiplexer 30 are switched to connect the sensor trace 201 or 202 to an input end mux1 or mux2 of the front-end signal detector 50, to be charged/discharged by a charge pump 501 for modulation to generate a modulated signal mux1 or mux2 that will be demodulated by a switching circuit 502 by switching switches S0~S3 thereof to generate signals pp and np to be further filtered by a low-pass filter 503 to generate signals ppeak and npeak at output ends. The signals ppeak and npeak will be amplified and converted by other circuits in the front-end signal detector 50 into digital signals which contain the sensed value ADC of the detected sensor trace 201 or 202. FIG. 3 schematically shows the noise coupling, in which the noise N having a fixed period is applied to the sensor trace 201 via a coupling capacitor Ccouple and thus incorporated into the modulated signal mux1 as noise, resulting in an error in detection to the capacitor C1. The noise N may be also transferred via the switching circuit 502 into the low-pass filter 503 and accumulate therein. The most serious effects of the noise N come from its positive edges and negative edges.

BRIEF SUMMARY OF THE INVENTION

An object of the present invention is to provide a front-end signal detector for improving noise immunity of a capacitive touch sensor.

Another object of the present invention is to provide a method for improving noise immunity of a capacitive touch sensor.

According to the present invention, a front-end signal detector for improving noise immunity of a capacitive touch sensor includes an input end to be connected with a sensor trace of the capacitive touch sensor, a charge pump connected to the input end, a switching circuit connected to the input end to generate a demodulated signal, a low-pass filter connected to the switching circuit to filter the demodulated signal, and an interrupter connected to the low-pass filter and controlled by an interrupt signal to break the path through which the demodulated signal is transferred to the low-pass filter.

According to the present invention, a method for improving noise immunity of a capacitive touch sensor includes charging/discharging a sensor trace of the capacitive touch sensor to generate a modulated signal, demodulating the modulated signal to generate a demodulated signal, filtering the demodulated signal, and interrupting the filtering of the demodulated signal responsive to an interrupt signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
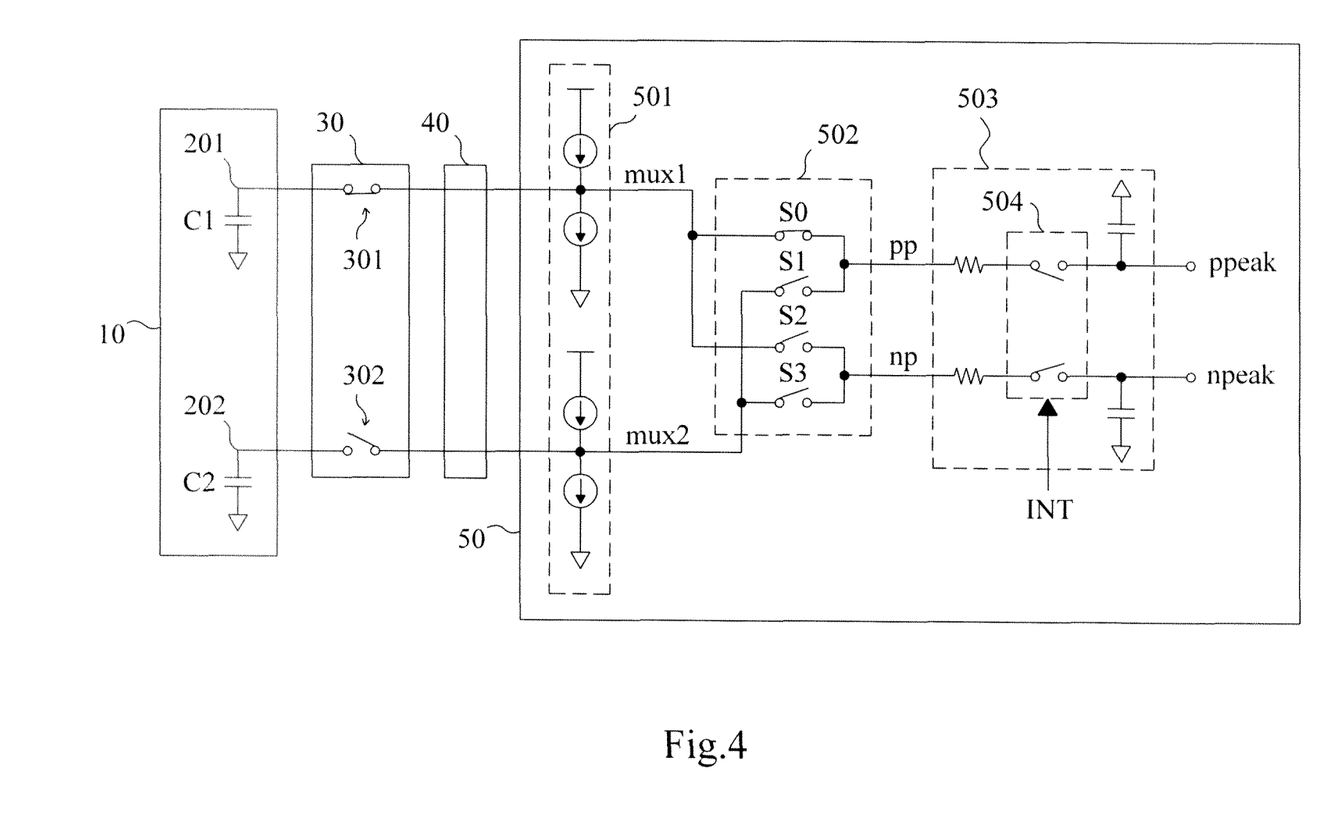
FIG. 4 is a schematic diagram of an embodiment according to the present invention.

FIG. 4 is a schematic diagram of an embodiment according to the present invention, which is designed based on the circuit shown in FIG. 2, with an interrupter 504 added in the low-pass filter 503. Except for the interrupter 504, the circuit of this embodiment operates in the same way as that of the conventional circuit shown in FIG. 2. Responsive to an interrupt signal INT, the interrupter 504 breaks or establishes the paths through which the demodulated signals pp and np come into the low-pass filter 503. The interrupt signal INT is generated by calculating the period of the noise N to be triggered at the timing of the positive edges and negative edges of the noise N where the noise N has the most prominent influence, to prevent the noise N from entering the low-pass filter 503, and consequently mitigates the influence of the noise N on the output signals ppeak and npeak. In different embodiments, the interrupter 504 may be connected between the switching circuit 502 and the low-pass filter 503 or be provided in the switching circuit 502.

Figure 5:
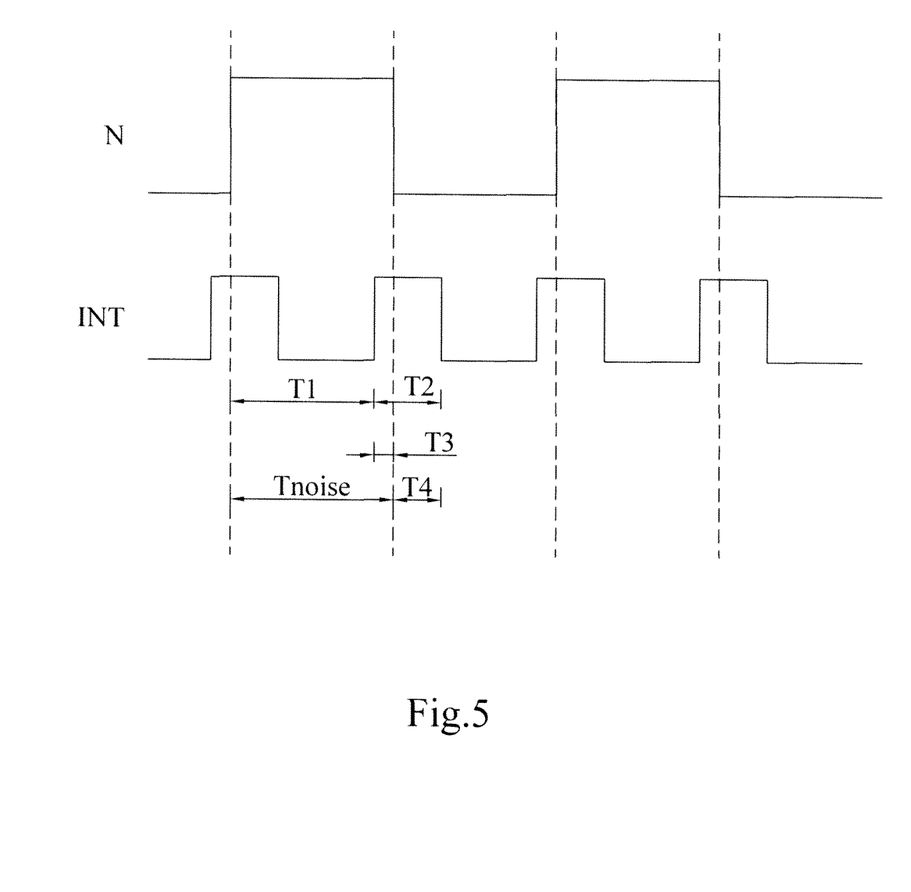
FIG. 5 is a waveform diagram of an interrupt signal in an example where the interference source has a duty of 50%.

FIG. 5 is a waveform diagram of the interrupt signal INT in an example where the interference source has a duty of 50%. The noise N in this example is caused by a fixed-frequency signal generated from an electronic component, so this fixed-frequency signal can be viewed as an interference source to the capacitive touch sensor. A positive or negative edge of the noise N is detected to start counting a preset time. When it counts to time T1, the interrupt signal INT is triggered. As a result, the interrupter 504 breaks the paths it provides, and the low-pass filter 503 stops accumulating the signals pp and np. At the end of the pulse T2 of the interrupt signal INT, the interrupter 504 restores its original paths. The duration 12 of the interrupt signal INT covers the next negative or positive edge of the noise N, thus allowing the low-pass filter 503 to avoid the positive and negative edges of the noise N that have the strongest impact. Since the duration Tnoise from the positive edge to the negative edge or from the negative edge to the positive edge of the noise N is equal to T1+T3, and T2=T3+T4, the pulse width T2 of the interrupt signal INT can be determined by detecting the noise N and setting the appropriate counting times T1 and T4.

Figure 6:
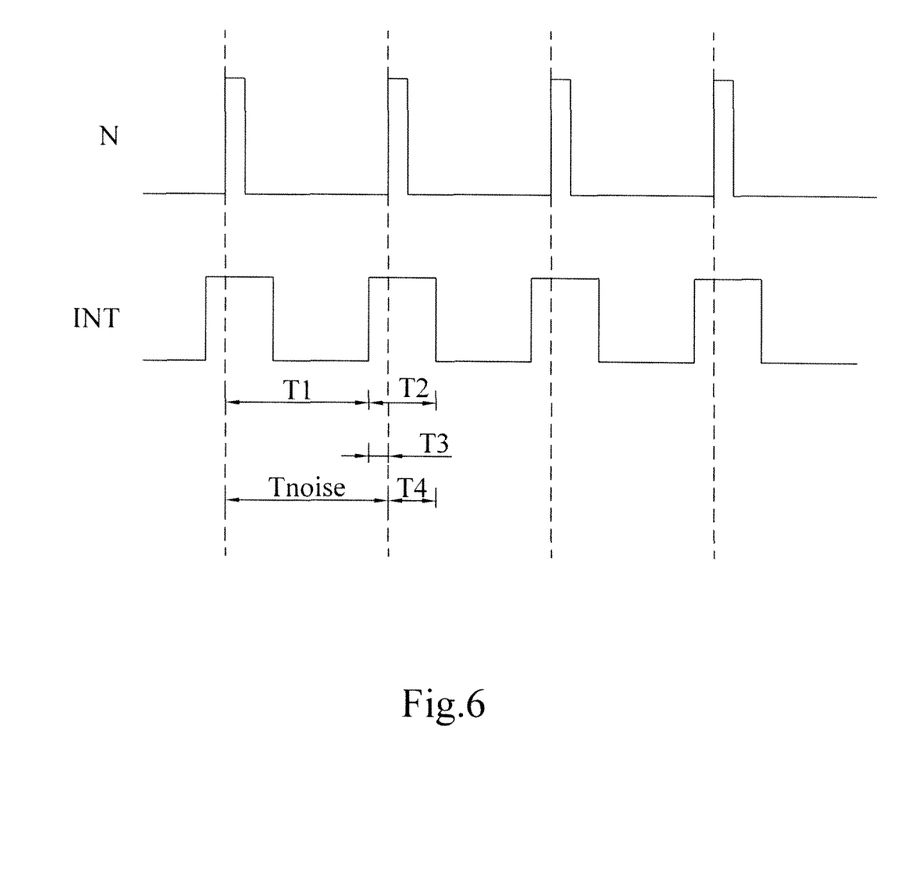
FIG. 6 is a waveform diagram of an interrupt signal in an example where the interference source has a duty less than 50%.

FIG. 6 is a waveform diagram of the interrupt signal INT in an example where the interference source has a duty less than 50%. The time counting is started at each positive edge of the noise N, and once it counts to time T1, the interrupt signal INT is triggered. The interruption is terminated at the end of the pulse T2 of the interrupt signal INT. As the pulse width T2 of the interrupt signal INT is wider than the on-time of the noise N, the influence of the noise N is completely removed.

Figure 7:
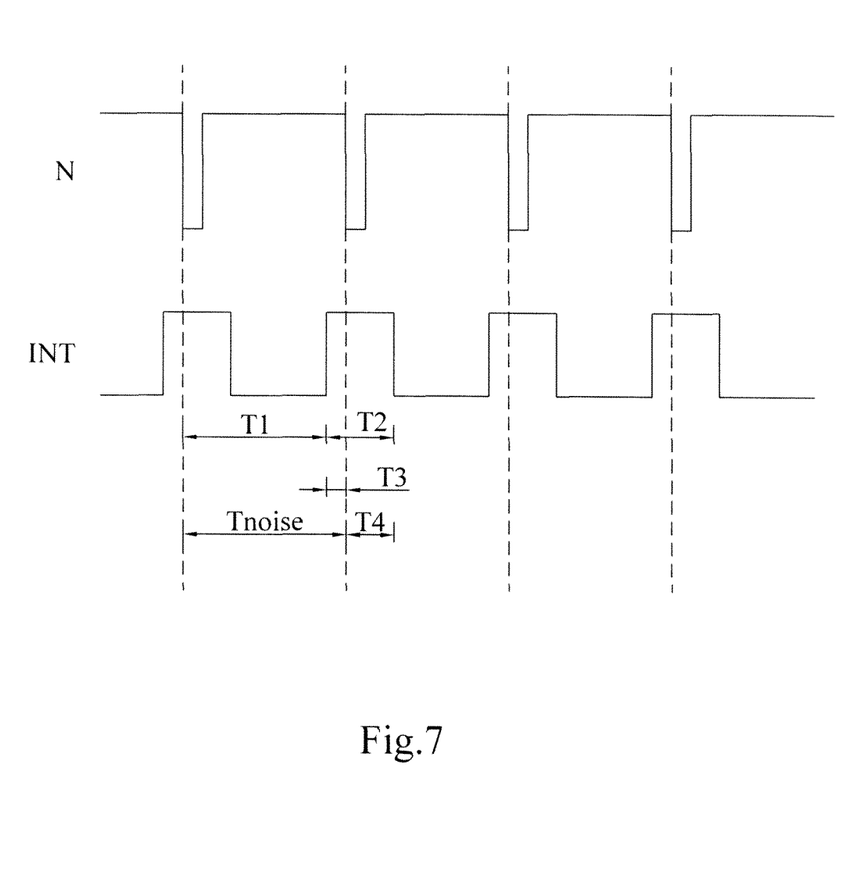
FIG. 7 is a waveform diagram of an interrupt signal in an example where the interference source has a duty greater than 50%.

FIG. 7 is a waveform diagram of the interrupt signal INT in an example where the interference source has a duty more than 50%. The time counting is started at each negative edge of the noise N, and when it counts to time T1, the interrupt signal INT is triggered. The interruption is terminated at the end of the pulse T2 of the interrupt signal INT.

Figure 8:
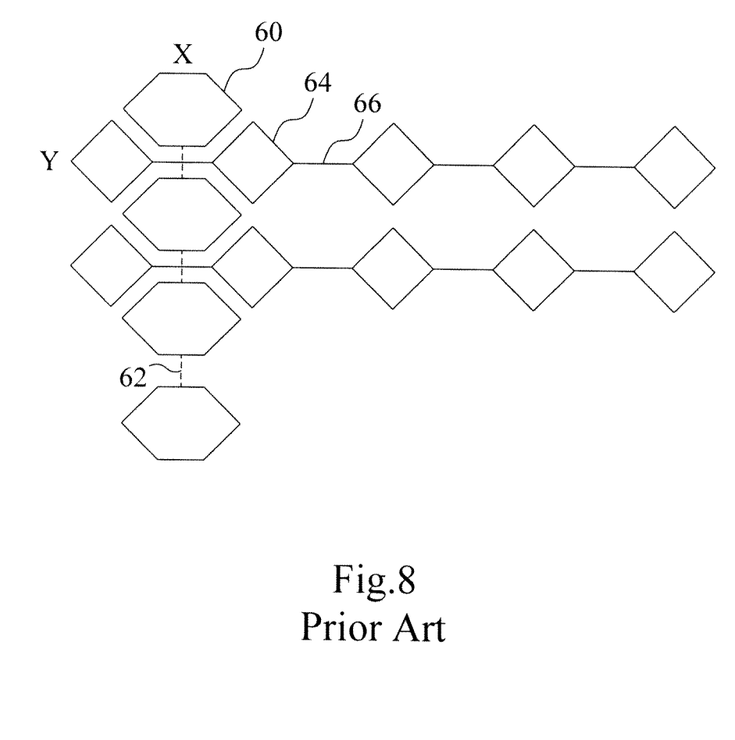
FIG. 8 is a schematic diagram of a general two-dimensional capacitive touch sensor.
Figure 9:
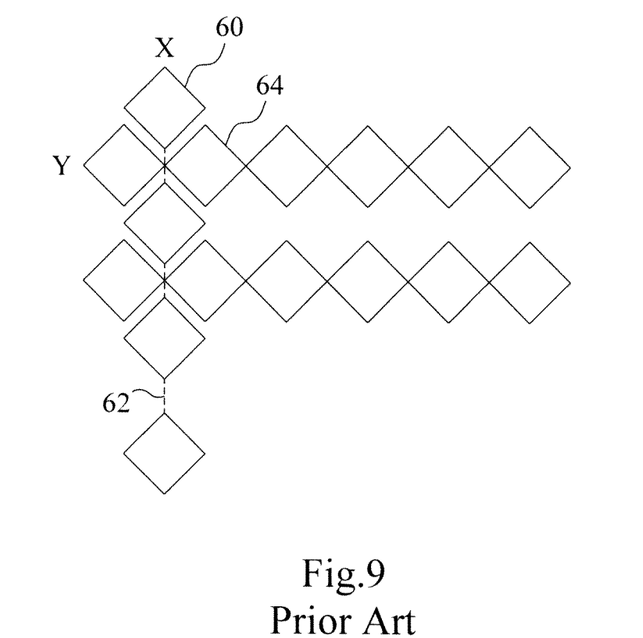
FIG. 9 is a schematic diagram of a general two-dimensional capacitive touch sensor.
Figure 10:
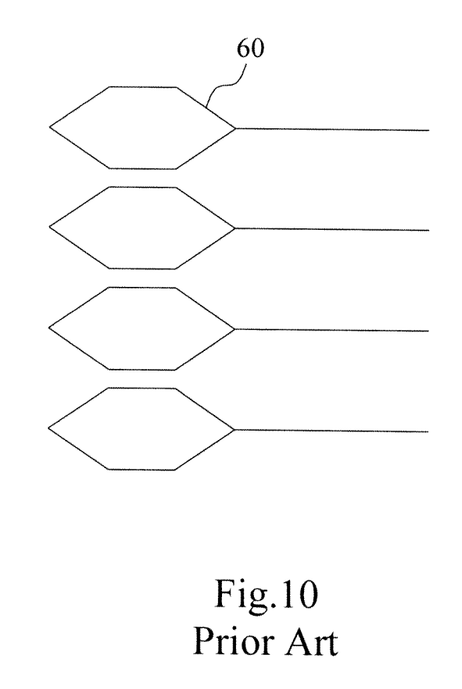
FIG. 10 is a schematic diagram of a general one-dimensional capacitive touch sensor.

The front-end signal detector according to the present invention is not limited by the shapes and dimensions of the sensor traces and is thus applicable to the capacitive touch sensors including sensor traces of various forms. For example, in FIG. 8, the X-direction sensor trace includes polygonal sensor pads 60 connected by bridging lines 62, and the Y-direction sensor trace includes diamond-shaped sensor pads 64 connected by connecting lines 66. In FIG. 9, the sensor pads 60 of the X-direction sensor trace are diamond-shaped and connected by bridging lines 62, and the sensor pads 64 of the Y-direction sensor trace are also diamond-shaped but are directly connected to each other. In other embodiments, the sensor pads may be of a circular shape or other shapes and may also be hollowed to adjust their capacitance values. The present invention is equally applicable to a capacitive touch sensor having one-dimensional sensor traces, such as the typical one-dimensional sensor traces shown in FIG. 10.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A front-end signal detector for improving noise immunity of a capacitive touch sensor including a plurality of sensor traces, the front-end signal detector comprising:
   an input end for being connected with one of the plurality of sensor traces;
   a charge pump connected to the input end;
   a switching circuit connected to the input end, operative to generate a demodulated signal;
   a low-pass filter connected to the switching circuit, for filtering the demodulated signal; and
   an interrupter connected to the low-pass filter and controlled by an interrupt signal to break a path through which the demodulated signal is transferred to the low-pass filter, wherein the interrupt signal is generated by counting a period of time responsive to a positive or negative edge of a noise and has a width starting before the edge and ending after the edge.

2. The front-end signal detector of claim 1, wherein the interrupter comprises a switch controlled by the interrupt signal.

3. A method for improving noise immunity of a capacitive touch sensor including a plurality of sensor traces, the method comprising the steps of:
   charging/discharging one of the plurality of sensor traces to generate a modulated signal;
   demodulating the modulated signal to generate a demodulated signal;
   filtering the demodulated signal;
   interrupting the filtering of the demodulated signal responsive to an interrupt signal; and
   starting counting a time responsive to a positive or negative edge of a noise to trigger the interrupt signal, which has a width starting before the edge and ending after the edge, to calculate the period of the noise.

4. The front-end signal detector of claim 1, wherein the period of time from the edge of the noise to the beginning of the interrupt signal is T1, the width of the interrupt signal is T2, the time from the end of Ti to the next edge is T3, the time from the next edge to the end of the interrupt signal is T4, the width of the noise signal is T1+T3 and T2=T3+T4.

5. The method for improving noise immunity of claim 3, wherein the period of time from the edge of the noise to the beginning of the interrupt signal is T1, the width of the interrupt signal is T2, the time from the end of Ti to the next edge is T3, the time from the next edge to the end of the interrupt signal is T4, the width of the noise signal is T1+T3 and T2 = T3 +T4.

6. A front-end signal detector for improving noise immunity of a capacitive touch sensor including a plurality of sensor traces, the front-end signal detector comprising:
   an input end for being connected with one of the plurality of sensor traces;
   a charge pump connected to the input end;
   a switching circuit connected to the input end, operative to generate a demodulated signal;
   a low-pass filter connected to the switching circuit, for filtering the demodulated signal; and
   an interrupter connected to the low-pass filter and controlled by an interrupt signal to break a path through which the demodulated signal is transferred to the low-pass filter, wherein the duration of the interrupt signal covers a positive and a negative edge of a noise.

7. The front-end signal detector of claim 6, wherein the interrupter comprises a switch controlled by the interrupt signal.

8. A method for improving noise immunity of a capacitive touch sensor including a plurality of sensor traces, the method comprising the steps of:
- charging/discharging one of the plurality of sensor traces to generate a modulated signal;
- demodulating the modulated signal to generate a demodulated signal;
- filtering the demodulated signal; and
- interrupting the filtering of the demodulated signal responsive to an interrupt signal, wherein the duration of the interrupt signal covers a positive and a negative edge of a noise.

9. The method of claim 8, further comprising the step of starting counting a time responsive to the positive or negative edge of the noise to trigger the interrupt signal when the counted time reaches a preset value.

\* \* \* \* \*